United States Patent Office 3,608,179
Patented Sept. 28, 1971

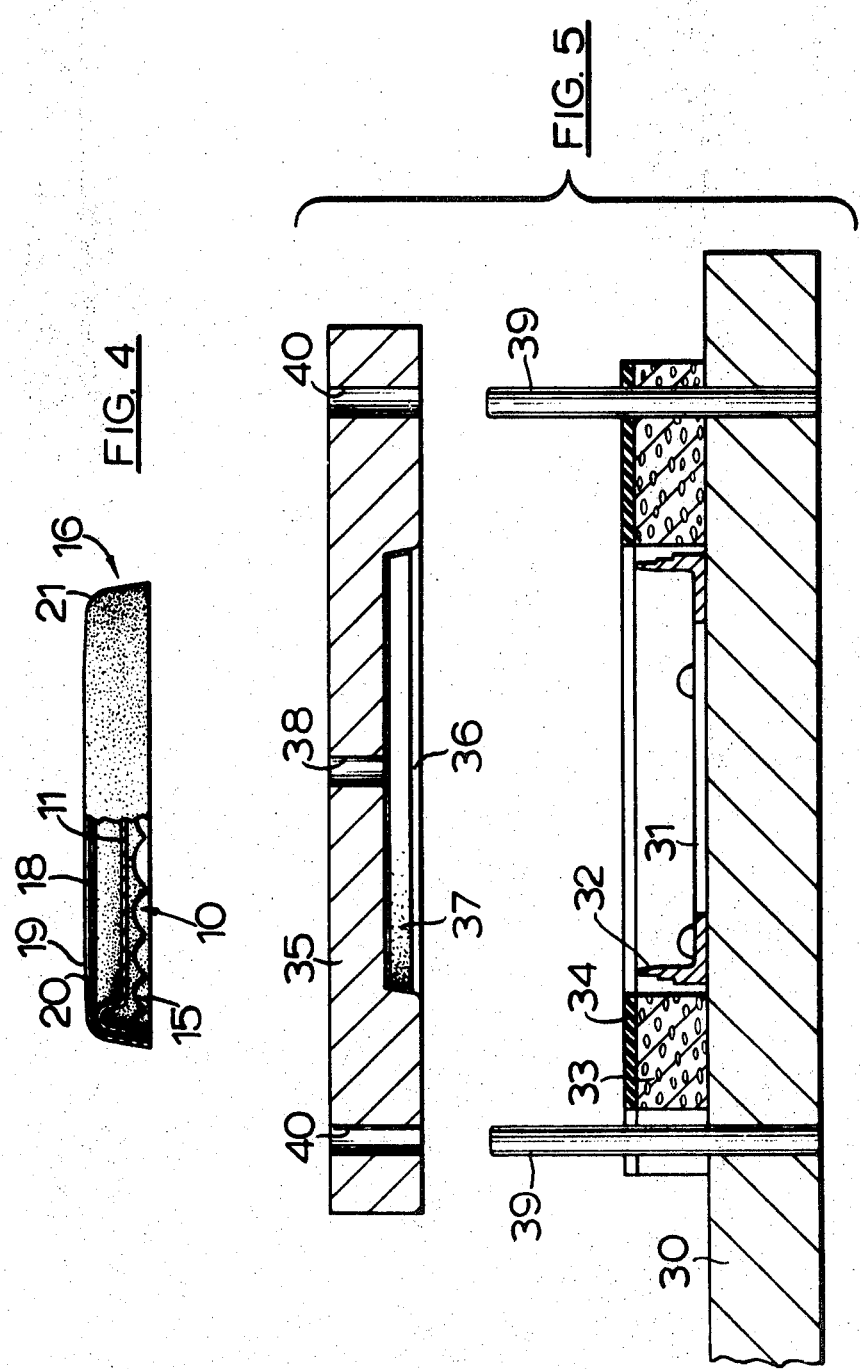

3,608,179
METHOD AND APPARATUS FOR THE MANUFACTURE OF MIRRORS
Herbert Jeffree, Byfleet, Surrey, and George Y. Benzies, Woking, Surrey, England, assignors to British Aircraft Corporation Limited, London, England
Filed Jan. 24, 1969, Ser. No. 793,798
Claims priority, application Great Britain, Jan. 31, 1968, 4,974/68
Int. Cl. B23p *11/02*
U.S. Cl. 29—446
10 Claims

ABSTRACT OF THE DISCLOSURE

A method and apparatus are described for producing mirrors with a reflecting surface of a thin flexible reflecting material in which a sheet of the reflecting material is stretched over a backing member having a raised peripheral ridge by gripping an outer zone of the sheet and drawing it down around the backing member, and an outer ring is subsequently fitted over the peripheral ridge of the backing member so as to trap the sheet between the outer ring and the backing member.

---

Figure 1:
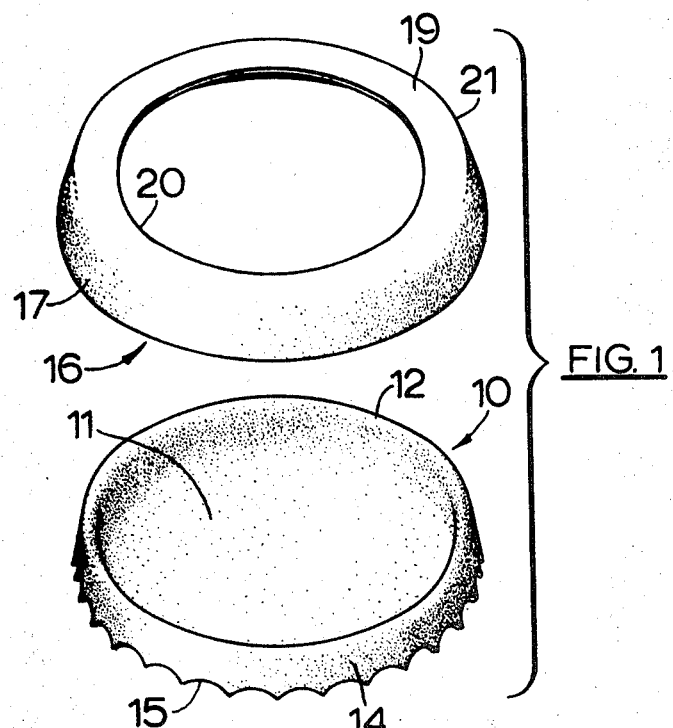

This invention relates to the manufacture of mirrors and more specifically to the production of plane mirrors having a reflecting surface of a thin flexible reflecting sheet material, such as a metallised plastic film, e.g. that sold under the trademark Vapcolex.

With such a material, it can prove difficult to obtain an optically flat surface free from wrinkles or folds. Various means of overcoming this problem have been proposed. It is an object of the present invention to provide a method and apparatus for production of such mirrors which will overcome the problem in a relatively simple manner.

According to the present invention, a method of producing a plane mirror having a reflecting surface of a thin flexible reflecting sheet material comprises the steps of supporting a sheet of the material in a substantially flat condition, gripping an annular zone of the sheet which is spaced outwardly from the portion of the sheet to be used in the mirror, causing relative movement in the direction normal to the sheet between the part of the annular sheet enclosed by the gripping zone and a backing member having a raised peripheral ridge whose top lies in a plane parallel with the said part of the sheet, so that the ridge contacts the sheet and causes the portion of the sheet within the area bounded by the ridge to be carried out of the plane of the annular gripping zone and thereby to be tensioned, and applying over the ridge an outer ring whose undersurface is shaped to fit closely over and around the ridge so as to trap the sheet between the outer ring and the periphery of the backing member.

According to another aspect fo the invention, we also provide an apparatus for producing a plane mirror having a reflecting surface of a thin flexible reflecting sheet material, a backing member with a raised peripheral ridge whose top lies in a plane, and an outer ring whose undersurface is shaped to fit closely over and around the ridge; the apparatus comprising means for supporting a sheet of the reflecting material is a substantially flat condition, means for gripping an annular zone of the sheet which is spaced outwardly from the portion of the sheet to be used in the mirror, means for supporting the backing member with the top of its peripheral ridge adjacent and parallel to the said portion of the sheet, means for causing relative movement in the direction normal to the sheet between the gripping means and sheet on the one hand and the backing member on the other hand, so that the ridge contacts the said portion of the sheet and causes the part of the sheet within the area bounded by the ridge to be carried out of the plane of the annular gripping zone and thereby to be tensioned, and means for applying the outer ring over the ridge so as to trap the sheet between the outer ring and the periphery of the backing member.

Preferably the coefficient of friction between the outer ring and the sheet is less than that between the sheet and the ridge of the backing member, so that the sliding contact between the outer ring and the sheet as the outer ring is applied over the ridge of the backing member will not cause excessive or irregular tension in the part of the sheet bounded by the ridge.

In some cases, the outer wall of the rim of the backing member may be flared downwardly and its bottom outer edge may be left sharp. The outer ring is then made deeper than the depth of the backing member, so that towards the final stage of the application of the outer ring the sheet is cut where it is trapped between the inside of the outer ring and the sharp edge of the backing member.

Figure 2:
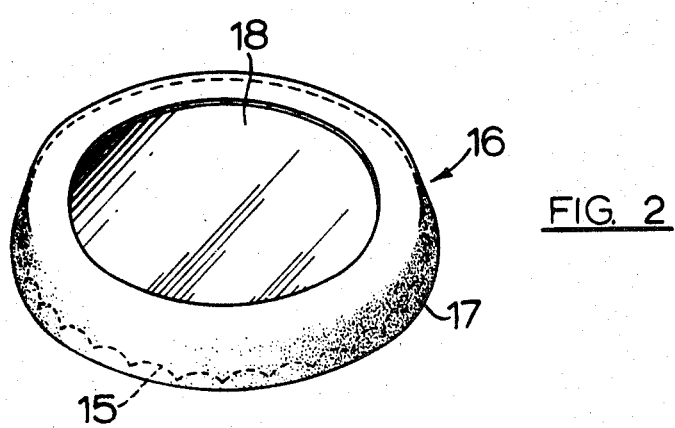
Figure 3:
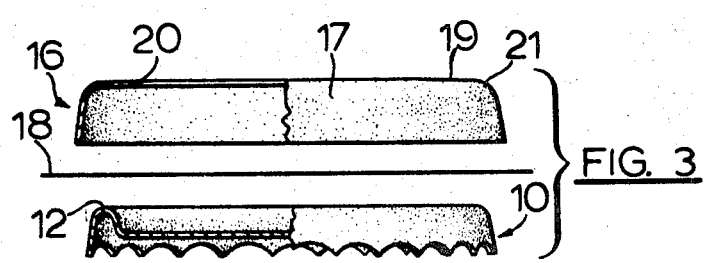
Figure 6:
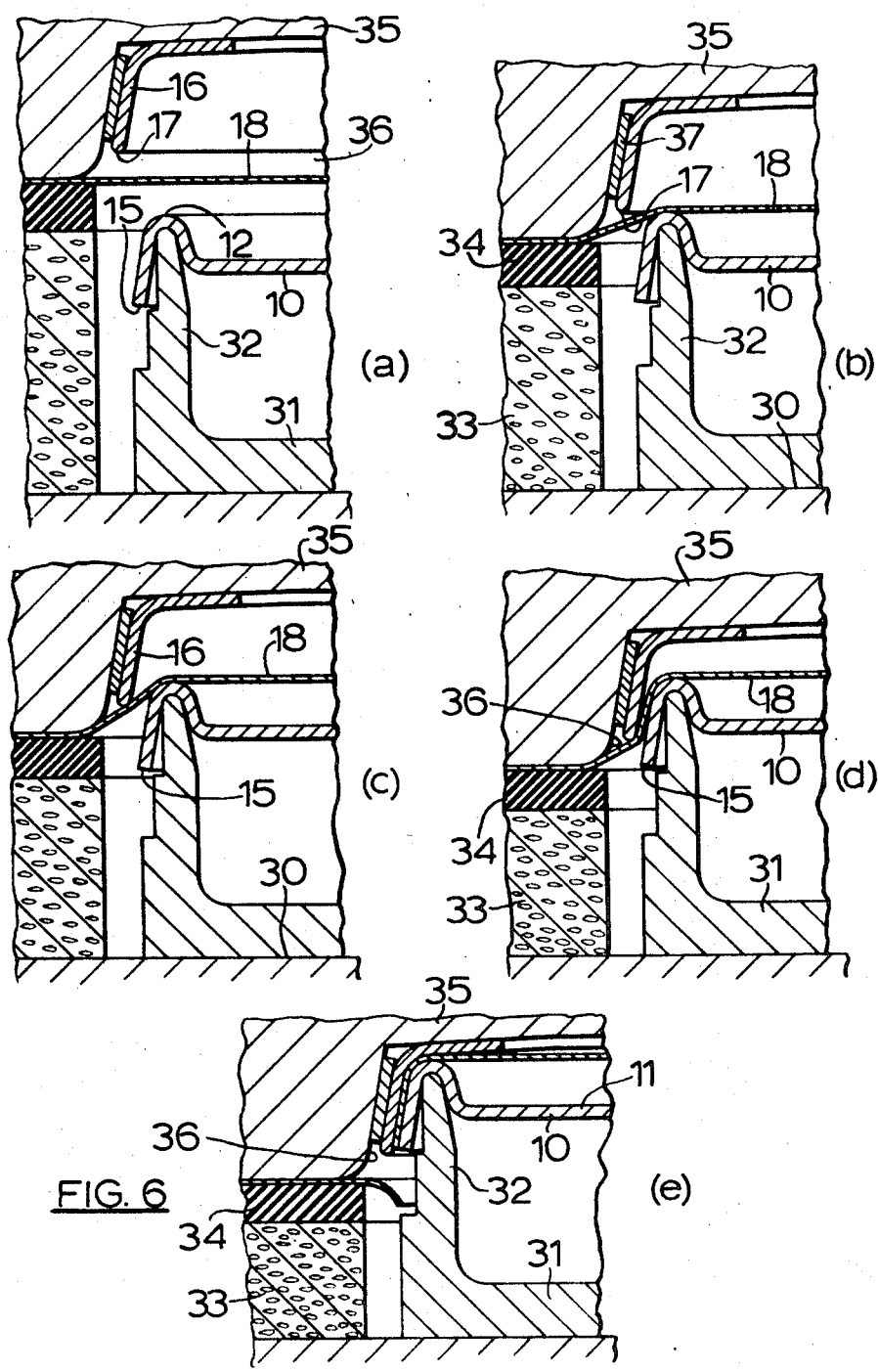

A particular embodiment of the invention will now be described by way of example, and with reference to the accompanying drawings, in which FIG. 1 is a perspective view of the outer ring and backing member of the mirror before assembly, FIG. 2 is a similar view of the assembled mirror, FIG. 3 is a part elevation, part-sectional view of the mirror components before assembly, FIG. 4 is a similar view of the assembled mirror, FIG. 5 is a sectional view of an apparatus according to the invention with the pressure plate lifted off, ready to receive the mirror components for assembly, and FIG. 6(*a*) to (*e*) is a series of detail views showing how the mirror components are moved together during assembly.

In the mirror shown in FIGS. 1 to 4, the backing member 10 is pressed from a disc of thin sheet metal and has a substantially flat central zone 11 surrounded by a low narrow raised ridge or rim 12 which, in turn, is surrounded by a downwardly extending flange 14 which is nearly cylindrical but is slightly flared downwardly so that its bottom diameter is slightly greater than its top diameter. Its lower outer edge 15 is left sharp and is preferably scalloped as shown to act as a cutting edge as described below. The outer ring 16 also is circular and its cross section is roughly of inverted L shape having a downwardly extending nearly cylindrical portion 17, which is an interference fit over the backing member 10 and a piece of the reflecting sheet material 18, and an inwardly extending portion 19 at the top whose inner edge 20 is slightly above the plane of its outer edge 21. It also is pressed from sheet metal but is subjected to a "rumbling" process to remove sharp edges, and to treatment with powdered talc to lower its coefficient of friction.

The apparatus shown in FIG. 5 comprises a wooden foundation 30, on which is mounted an annular turned metal support 31 having an upstanding flange 32 on to which the backing member 10 fits with a small diametral clearance, with the zone of contact directly supporting the raised rim 12.

Around this metal support is an annular layer of elastic sponge material 33 bonded on its top surface to a ring 34 of thin tough sheet rubber, the upper face of which may have been moulded against a woven fabric to give it a textured gripping surface.

In the process of assembly, pressure is applied by means of a plate or disc 35, e.g. of plastics material, centrally recessed at 36 on its lower surface and fitted with means, e.g. a lining 37 of velvet ribbon, to accept, centre and lightly hold an outer ring 16 with the lower edge of the ring above the lower face of the pressure plate 35. The plate 35 is provided with a central hole 38 to permit escape of air. The plate 35 is restrained from lateral motion or tilting by guide bars 39 which pass through holes 40 in the plate. It may be further restrained from tilting out of the horizontal plane by parallel motion links (not shown) and it can be pressed down over the main support by a toggle press (not shown). The lower face of the plate 35 then co-operates with the rubber ring 34 to form the annular gripping means.

In use the backing member 10 is placed on the turned metal support 31 and a piece 18 of "Vapcolex" reflecting sheet or foil of mirror quality is placed on the rubber ring 34 which supports it in a substantially flat condition at a slightly higher level than the top of the ridge 12 of the backing member. The piece of foil may be a pre-cut piece or a zone unwrapped from a continuous roll of foil. It should overlap the rubber ring 34 all round and be free from all other restraint. The outer ring 16 is placed in the recess 36 in the pressure plate 35 which is lowered over the "Vapcolex" foil 18 and over the guide bars 39 and then forced fully downward by the toggle press.

As the pressure plate 35 descends, it first grips the "Vapcolex" foil 18 between its lower face and the upper face of the rubber ring 34 (FIG. 6(a)). As it descends further, an annular zone of the plastic sponge material 33 is compressed and the force taken to compress it determines the extent of the gripping of the foil 18. Next, in its downward travel, the "Vapcolex" foil 18 contacts the upper surface of the ridge 12 of the backing member 10. Further motion causes the foil 18 to take the form of a central flat bounded by a slope down to a parallel plane annular zone over the rubber ring 34 as shown in FIG. 6(b). As this distorted form has a greater area than a flat of the same diameter, this results first in taking up all slack in the film 18, secondly in elastically tensioning the film before any slip occurs in the gripping zone, thirdly in this tension involving frictional restraint between the "Vapcolex" foil 18 and the backing member 10 such that no loss of tensioning occurs but rather a slight increase as further movement of the pressure plate 35 downward causes an inward feeding of foil through the annular gripping zone. At this stage a fine regular folding of foil is initiated in the gripping zone but does not extend as far as the initial line of contact between the foil 18 and the backing member 10.

Only after this initial sequence does the lower edge of the portion 17 of the outer ring 16 come in contact with the foil 18. As the rounded lower edge of the outer ring 16 slides down over the foil 18 it causes some further increase of tension over the central flat but this increase is held to safe limits by ensuring, as aforesaid, that the coefficient of friction between the outer ring 16 and the foil 18 is less than the coefficient of friction between the foil 18 and the backing member 10. The tension in the portion of foil 18 which is being wrapped round the backing member 10 will continue to increase at a rate controlled by the characteristics of the foam plastics 33 which supports the rubber ring 34. The downward motion next clamps the foil between the outer ring 16 and the periphery of the backing member 10 without increasing the tension in the central zone any more because of the difference of coefficient of friction aforesaid.

Subsequently the inner surface of the downwardly extending portion 17 of the outer ring 16 co-operates with the sharp scalloped edge 15 at the bottom of the downwardly extending flange 14 of the backing member 10 to cut through the "Vapcolex" foil 18 where it is trapped between them. Finally the downward motion of the outer ring 16 continues until the lower surface of its inwardly extending top flange 19 contacts the film 18 on the ridge 12 of the backing member 10 just outside the highest part of the ridge, and equally all round. The assembly force is so adjusted that this condition is reached as a positive obstruction to further motion, but it is insufficient to cause any damage.

It is important that the outer ring 16 should be a close fit over the flange 14 of the backing member 10. The provision of the metal support 31 for the latter at the zone which defines the plane of the mirror and the requirement that the outer ring 16 is also pushed down to a position of good contact all round ensures the planarity of the mirror. The strength with which the foil 18 is gripped between the pressure plate 35 and the rubber ring 34 can be adjusted as may be necessary by choice of the intrinsic compressibility of the plastics sponge material 33, by changing its thickness and its radial extent, by altering the stiffness and the radial extent of the rubber ring 34, or by altering the nature of the co-operating surfaces of the ring 34 and plate 35. As before mentioned, the uniformity of grip on the foil 18 under the pressure controlled by the deflection of the sponge 33 causes a uniform tensioning and ensures that the wrinkling of the foil inherent in such a wrapping operation shall be fine, uniformly distributed and confined to the zone outside the ridge 12 which defines the mirror area of the foil.

We claim:

1. A method of producing a plane mirror having a reflecting surface of a thin flexible reflecting sheet material by use of a press having two relatively movable elements, comprising the steps of supporting a sheet of material in a substantially flat condition in the press, gripping an annular zone of the sheet which is spaced outwardly from the portion of the sheet to be used in the mirror, effecting initial relative movement in the direction normal to the sheet between one of said elements against which the annular zone of the sheet is pressed by the annular gripping zone and a backing member which is mounted on the other element and which has a raised peripheral ridge whose top lies in a plane parallel with the said zone of the sheet, so that the ridge contacts the sheet and causes the portion of the sheet within the area bounded by the ridge to be carried out of the plane of the annular gripping zone and thereby to be tensioned, effecting further relative movement in said direction so as to apply over the ridge an outer ring which is carried by said one element and the undersurface of which is shaped to fit closely over and around the ridge so as to trap the sheet between the outer ring and the periphery of the backing member.

2. A method of producing a plane mirror according to claim 1, including treating the outer ring to ensure that the coefficient of friction between the outer ring and the sheet is less than the coefficient of friction between the sheet and the ridge of the backing member.

3. A method of producing a plane mirror according to claim 1, including cutting the sheet around the periphery of the backing member in the last stage of assembly by trapping the sheet between a peripheral flange portion of the outer ring and a sharp-edged peripheral flange on the backing member.

4. A method of producing a plane mirror according to claim 3, including co-acting the peripheral flange portion of the outer ring with a series of sharp downwardly extending points on a scalloped lower edge of the peripheral flange on the backing member, to effect cutting of the sheet.

5. Apparatus for producing a plane mirror having a reflecting surface of a thin flexible reflecting sheet material, a backing member with a raised peripheral ridge whose top supports the reflecting sheet in a plane and an outer ring whose undersurface is shaped to fit closely over and around the ridge on the backing member; said apparatus comprising a press having first and second relatively movable press elements and means for supporting the sheet of the reflecting material in a substantially flat condition by pressing an annular zone of the sheet which is spaced outwardly from the central portion of the sheet to be used in the mirror against the first element, the second element being arranged to support the backing member with the top of its peripheral ridge adjacent and parallel to said central portion of the sheet, means for effecting initial relative movement in a direction normal to the sheet between the press elements so that the backing member contacts a portion of the sheet and causes the central portion of the sheet to be carried out of the plane of the annular gripping zone and thereby to be tensioned, said first element being arranged to carry the outer ring so that further relative movement in said direction causes the outer ring to press over the ridge so as to trap the sheet between the outer ring and the periphery of the backing member.

6. Apparatus according to claim 5, wherein said second element comprises an annular support adapted to fit below the underside of the peripheral ridge of the backing member and to support it against deformation.

7. Apparatus according to claim 6, wherein the means for supporting the sheet of reflecting material comprises a ring of resilient material disposed concentrically around the annular support, the surface of the resilient ring which engages the sheet being, in the uncompressed condition, spaced from the plane of the peripheral ridge of the backing member.

8. Apparatus according to claim 7, wherein the resilient ring comprises a rubber ring having flat upper and lower surfaces, resting upon a ring of material which is highly compressible, so as to permit movement of the gripped annular zone of the sheet down through the plane of the ridge of the backing member while remaining parallel thereto.

9. Apparatus according to claim 7, wherein said first element is in the form of a pressure plate arranged to be capable of movement in the direction normal to its own plane and to the plane of the resilient ring, and having an annular surface adapted to co-operate with the sheet-engaging surface of the resilient ring to grip the annular zone of the sheet between them.

10. Apparatus according to claim 9, wherein said first element has a recess adapted to hold the outer ring.

References Cited

UNITED STATES PATENTS

| | | | |
|---|---|---|---|
| 173,720 | 2/1876 | Guerin | 29—Tens. Dig. UX |
| 3,180,220 | 4/1965 | Jeffree | 160—378 |

FOREIGN PATENTS

| | | | |
|---|---|---|---|
| 1,354,837 | 2/1964 | France | 350—310 |

CHARLIE T. MOON, Primary Examiner

U.S. Cl. X.R.

29—238, 525; 160—378; 350—310